(12) United States Patent
Wiegert

(10) Patent No.: US 6,781,380 B1
(45) Date of Patent: Aug. 24, 2004

(54) ACTIVE MAGNETIC ANOMALY SENSING ARRAY AND PROCESSING SYSTEM

(75) Inventor: Roy F. Wiegert, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 25 days.

(21) Appl. No.: 10/303,576

(22) Filed: Feb. 12, 2003

(51) Int. Cl.[7] .......................... G01V 3/10; G01R 33/00
(52) U.S. Cl. ...................................... 324/329; 324/260
(58) Field of Search ............................... 324/234–235, 324/242–243, 259–260, 326, 329

(56) References Cited

U.S. PATENT DOCUMENTS 6,362,625 B1 * 3/2002 Wiegert ...................... 324/329

* cited by examiner

Primary Examiner—Bot LeDynh
(74) Attorney, Agent, or Firm—James T. Shepherd; Donald G. Peck

(57) ABSTRACT

An active magnetic anomaly sensing and processing system has a plurality of transceivers positioned at known relative positions on a platform. Each transceiver includes i) a transmitter for transmitting a magnetic field towards a target to cause propagation of a magnetic anomaly field from the target, and ii) a sensor that produces a first output indicative of the magnetic anomaly field and background magnetic fields. A reference sensor, positioned further from the target than each of the transceivers' sensors, senses background magnetic fields and produces a second output indicative thereof. Each transmitter is activated and subsequently deactivated simultaneously to define a transmission time and a non-transmission time, respectively. Scalar magnitudes of each first output and the second output produced during the non-transmission time form quantities that are indicative of presence, location and classification of the target.

10 Claims, 1 Drawing Sheet

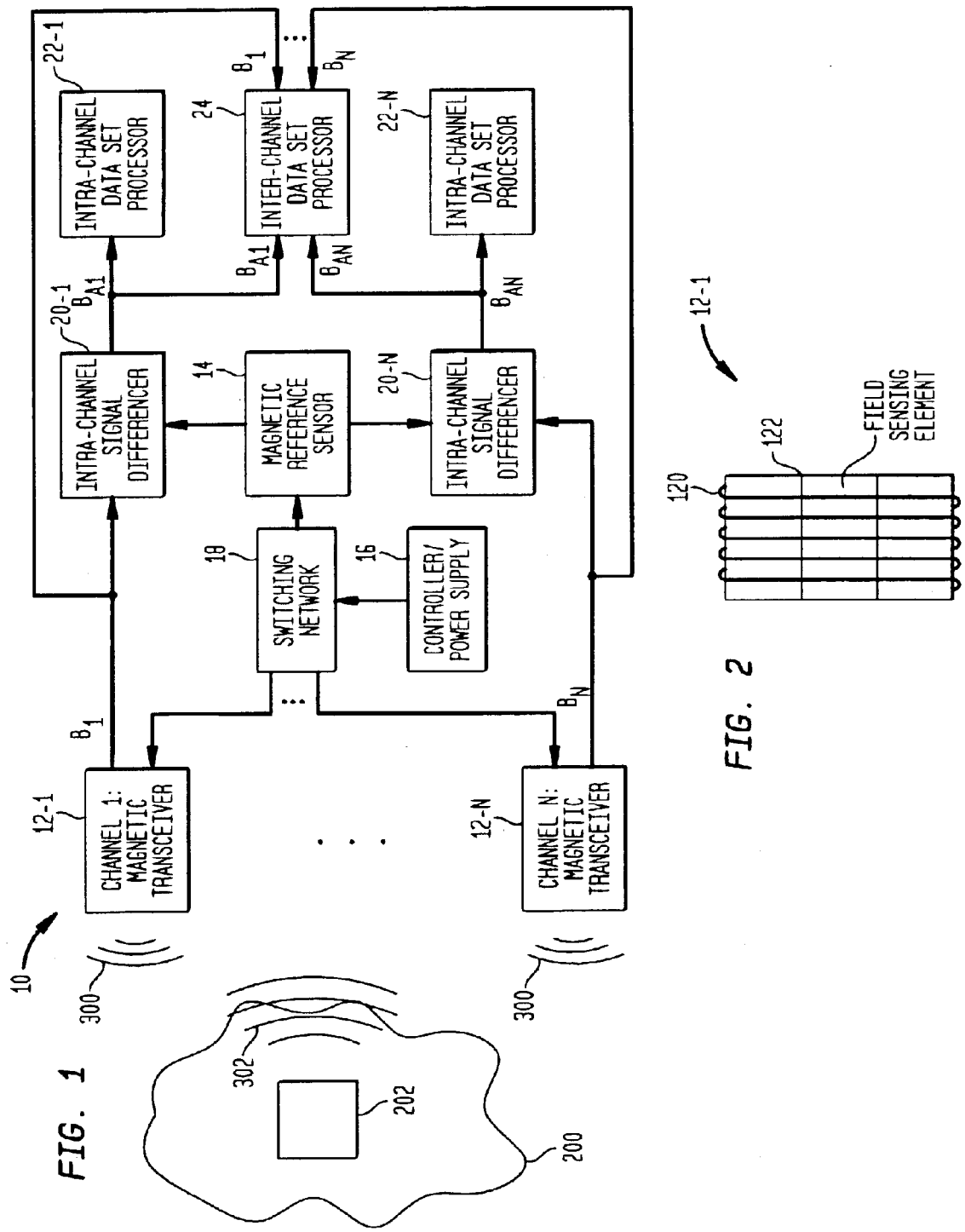

ACTIVE MAGNETIC ANOMALY SENSING ARRAY AND PROCESSING SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to magnetic sensing systems, and more particularly to a magnetic anomaly sensing array and processing system that uses a plurality of precision synchronized transceivers to directly measure magnetic field strength at a plurality of locations and that processes the measurements to generate quantities indicative of presence, location and classification of a target.

BACKGROUND OF THE INVENTION

The basic construction of a prior art eddy-current-based active magnetic anomaly sensor system includes a transmitter and a receiver. The transmitter induces anomalous magnetic induction fields in an electrically conductive or magnetic target located in the sensor detection space. The receiver detects/discriminates the anomalous magnetic induction fields propagating from the target. The transmitter typically consists of electronic circuitry that drives a time dependent electrical current through an induction coil to generate a time and vector distance dependent magnetic induction field. The induction coil can be driven by a continuous wave or pulsed signal. When the generated magnetic induction field interacts with a target, anomalous magnetic moments are induced with in the target which, in turn, cause anomalous magnetic fields to propagate from the target. The sensor system's receiver typically consists of an induction or "search coil" sensor coupled to signal amplification and processing circuitry to condition and process the magnetic fields detected by the search coil. Through Faraday induction, the search coil generates a voltage proportional to the time derivative of the target's magnetic anomaly fields lying along the search coil's axis. Such sensor systems have a variety of shortcomings.

For portable active sensor systems having a transmitter and receiver in close proximity to one another, the spatial variation between the actively induced magnetic anomaly field and its time derivative at the receiver decreases with the inverse 6-th power of target-to-receiver distance. Accordingly, to double the detection range of a sensor system, transmitter amplitude or receiver sensitivity must be increased by a large factor, i.e., a factor of $2^6$ or 64. Also, relying on the time derivative of the magnetic anomaly field limits the sensor's time discrimination capability, receiver bandwidth and low frequency sensitivity.

Another shortcoming of prior art active magnetic anomaly sensing systems is the interference generated by the transmitter at the receiver. Since the transmitter drive fields are many orders of magnitude larger than the target's induced magnetic anomaly fields, the transmitted signal has a tendency to overwhelm or jam the reception of the much smaller magnetic anomaly fields. Even with specialized transmitter-receiver geometries, systems that use a continuous wave transmitter drive signal tend to lose much of a target's transient response. To combat this problem, pulsed transmitters are used and operate on the theory that reception occurs when the transmitter is off. While this works to a certain degree, time constant or transient effects of a typical transmitter coil last for tens of microseconds. Unfortunately, it is in this time frame that the strongest target-signature-related magnetic anomaly field transients are generated by the target. Thus, even though the transmitter coil is deactivated, coil transients tend to jam reception of the strongest magnetic anomaly fields. This problem precludes the use of prior art active magnetic anomaly sensing systems in the detection of non-conductive plastic mines in a conductive media (e.g., seawater) since plastic mines have an extremely short transient response.

Still another shortcoming of prior art active magnetic anomaly sensor systems stems from the use of inductive search coils as the magnetic anomaly field sensing element. Specifically, this type of sensing element responds primarily to the time derivative of magnetic flux change components that are parallel to the coil's axis. Therefore, the sensing element has limited spatial direction sensing capabilities for resolving the direction and magnitude of the three-dimensional vector components that comprise the magnetic anomaly field caused by the target. The lack of three-dimensional resolution limits the system's target localization and classification capabilities.

To address these shortcomings, U.S. Pat. No. 6,362,625 teaches a magnetic anomaly sensing system having a precision synchronized transceiver that directly measures magnetic field strength for improved detection and/or discrimination of targets. A transmitter is activated and subsequently deactivated. During transmitter activation, a magnetic field is transmitted towards a target such that the magnetic field induces magnetic moments in the target which cause a magnetic anomaly field to propagate from the target. A first multi-axis magnetic sensor is positioned a distance D from the target, while a second multi-axis magnetic (reference) sensor is positioned a distance (D+d) from the target. Outputs from the two sensors are read during the times that the transmitter is deactivated. The second (reference) sensor's output is subtracted from the first sensor's output to generate a differential output indicative of the magnetic anomaly field propagating from the target. Means and methods are provided to synchronize the response characteristics of the sensors with one another, and to synchronize the transmitter with the sensors so that deactivation of the transmitter results in a near instantaneous detection of magnetic field transients by the first sensor.

The system disclosed in U.S. Pat. No. 6,362,625 provides for target stimulation by a single transmitter and for the detection and discrimination of correlated three-dimensional information content of target signals at a single point in space. However, this single transceiver configuration still results in ambiguities with regard to the actual location and classification of the target. Also, the effective detection range of the single transceiver configuration is still limited by the aforementioned variation of signal amplitude with the inverse sixth power of target-to-receiver distance. While such target localization and classification ambiguities can be resolved by sweeping the target search area with the single transceiver, this procedure may not always be practical or efficient. For example, robotic platforms used in the localization and classification of targets in a minefield must be able to carry out their target sensing tasks quickly and efficiently as the robotic platform moves through the minefield.

SUMMARY OF THE INVENTION

Accordingly, it is an object of the present invention to provide a system that can be used to aid in the detection, localization and classification of magnetic anomalies associated with a target.

Another object of the present invention is to provide a sensing and processing system that can be used to aid in the detection, localization and classification of magnetically polarizable targets.

Other objects and advantages of the present invention will become more obvious hereinafter in the specification and drawings.

In accordance with the present invention, an active magnetic anomaly sensing and processing system/method are provided. A plurality of transceivers are positioned at known relative positions on a platform. Each transceiver includes i) a transmitter for transmitting a magnetic field towards a target area to induce magnetic moments in a target which, in turn, cause a magnetic anomaly field to propagate from the target, and ii) a sensor positioned a distance from the target for sensing magnetic field strength and producing a first output indicative thereof. A reference sensor is positioned further from the target than each of the transceivers' sensors. The reference sensor is capable of sensing magnetic field strength and producing a second output indicative thereof. Each transmitter is selectively activated and subsequently deactivated simultaneously to define a transmission time and a non-transmission time, respectively. Scalar magnitudes of each first output and the second output produced during the non-transmission time form quantities that are indicative of presence, location and classification of the target.

BRIEF DESCRIPTION OF THE DRAWINGS

FIG. 1 is a functional block diagram of an active magnetic anomaly sensing array and processing system in accordance with an embodiment of the present invention; and FIG. 2 is a schematic view of a transceiver used in the array.

DETAILED DESCRIPTION OF THE INVENTION

Referring now to the drawings, and more particularly to FIG. 1, an embodiment of an active magnetic anomaly sensing array and processing system in accordance with the present invention is shown and referenced generally by numeral 10. System 10 can be mounted on any stationary or movable low-magnetic-signature platform (not shown) composed of non-magnetically polarizable materials. System 10 can be used to detect any magnetically polarizable object or target by actively stimulating and then detecting the target's magnetic signature response at a plurality of sensing positions. The responses are processed to generate magnetic field vector, scalar and tensor quantities indicative of the target's presence, location and classification.

Sensor system 10 includes a plurality of fixed-position multi-axis magnetic transceivers 12-1, . . . , 12-N, each of which is identical. Accordingly, a description of transceiver 12-1 will suffice. Referring additionally to FIG. 2, transceiver 12-1 has a transmitter coil 120 that, when energized or activated, transmits a magnetic field 300 towards a target area of interest 200 which can have a target 202 residing therein. Details of transmitter coil 120 are described in U.S. Pat. No. 6,362,625 (i.e., "the '625 patent" as it will be referred to hereinafter), the contents of which are hereby incorporated by reference.

To be detectable, target 202 must either be made at least partially from electrically conductive or ferromagnetic materials, or be made from materials having a conductivity that is significantly different than that of the surrounding media. These criteria will be assumed for purposes of describing the present invention. Thus, magnetic field 300 induces magnetic moments in target 202 which cause a magnetic anomaly field 302 to propagate therefrom.

Positioned within, adjacent or otherwise near transmitter coil 120 is a magnetic sensor 122 such as a magnetoresistive field sensing element as disclosed in the '625 patent. Magnetoresistive field sensing element 122 has at least one ferromagnetic thin film element disposed along an axis. This is known as the field sensing axis. One or more field sensing axes can be defined by sensing element 122. The resistance, and consequently the output voltage, of each thin-film element disposed along a field sensing axis changes as a function of magnetic field strength that is parallel thereto. In terms of three-dimensional field sensing, sensing element 122 is a multi-axis sensor with thin-film elements disposed along three mutually orthogonal X, Y and Z directions.

System 10 further includes a magnetic (reference) sensor 14 located/positioned such that it will be further from target area 200 (and target 202) than sensing elements 122 of magnetic transceivers 12-1, . . . , 12-N. Reference sensor 14 can be identical to sensing element 122, but is positioned further from target 202 so that it will not measure the highly transient induced magnetic field 302 produced by target 202 in response to impingement by magnetic field 300. Accordingly, reference sensor 14 only detects background magnetic fields. If reference sensor 14 is a multi-axis sensor, it's field sensing axes are aligned parallel to the corresponding field sensing axes of each sensing element 122. In other words, the corresponding field sensing axes of all sensing elements (i.e., each sensing element 122 and reference sensor 14) are aligned parallel to one another. Details of spacing between a single transceiver and the reference sensor, as well as mounting considerations therefor, are explained in the '625 patent.

As also explained in detail in the '625 patent, a polarity biasing coil (not shown) can be coupled to each sensing element 122 and reference sensor 14. When energized, the polarity biasing coil causes its respective sensing element to magnetically saturate along each field sensing axis to a selected polarity. Once saturated to a polarity, reference sensor 14 and sensing elements 122 are poised to operate at their greatest possible sensitivity level when the saturating field is removed thereby placing reference sensor 14 and each sensing element 122 in the receiving mode.

Coupled to each of transceivers 12-1, . . . , 12-N and reference sensor 14 is a controller/power supply 16 via a switching network 18. Switching network 18 represents a plurality of switches (e.g., solid state switches such as high current handling MOSFET switches) controlled by signals received from controller/power supply 16. Specifically, during a transmission time, switching network 18 is controlled to route current from supply 16 to simultaneously i) activate transmitter coils 120 (thereby generating magnetic fields 300) and ii) saturate sensing elements 122 and reference sensor 14 to a polarity as described above. Subsequently, switching network 18 is controlled to simultaneously remove current from each of transmitter coils 120, sensing elements 122 and reference sensor 14. During this time of non-transmission of magnetic field 300, sensing elements 122 and reference sensor 14 sense magnetic field strength. Because of their positions relative to target 202 and the highly transient nature of induced magnetic anomaly field 302, the magnetic field sensed by sensing elements 122 will be a combination of induced magnetic anomaly field 302 and background magnetic fields whereas the magnetic field strength sensed by reference sensor 14 will be essentially due to just background magnetic fields.

The output signals generated by each of sensing elements 122 and reference sensor 14 (in the reception mode) are simultaneously supplied to respective intra-channel signal differencers 20-1, ..., 20-N to generate a difference signal. If sensing elements 122 and reference sensor 14 are set to the same polarity (by their respective polarity biasing coil), signal differencers 20-1, ..., 20-N are subtraction circuits. Conversely, if sensing elements 122 and reference sensor 14 are set to opposite polarities, signal differencers 20-1, ..., 20-N could be summing circuits. In either case, the difference signal can also undergo (within differencers 20-1, ..., 20-N) a variety of signal conditioning processes (e.g., amplification, filtering, signal integration, A/D conversion, digital storage, etc.). A variety of configurations of such signal processing electronics would be well known to one of ordinary skill in the art and, as such, does not constitute a limitation of the present invention.

In operation, transmission of magnetic field 300 towards target 202 occurs when controller/power supply 16 supplies a switch control pulse to switching network 18 and supplies current to activate each transmitter coil 120. Simultaneously, current is supplied to the polarity biasing coils (not shown) associated with each sensing element 122 and reference sensor 14. During the reception mode of system 10, a switch control pulse from controller/power supply 16 causes switching network 18 to operate such that current is removed from each of transmitter coils 120 and the polarity biasing coils associated with each of sensing elements 122 and reference sensor 14. Since each of sensing elements 122 and reference sensor 14 are magnetically saturated when the biasing current is removed, each of sensing elements 122 and reference sensor 14 are synchronized to the same point of their response curve as the system switches from the transmit to the receive mode. Further, since each of sensing elements 12 and reference sensor 14 are saturated when the bias current is removed, each element is operating at its highest possible reception sensitivity within nanoseconds after transmitter coils 120 are deactivated.

The outputs of sensing elements 122 are differenced with respect to the output of reference sensor 14 on an intra-channel basis at respective signal differencers 20-1, ..., 20-N as described above. As a result of such differencing, background magnetic fields are mathematically removed leaving a measure of magnetic anomaly field 302 or $B_A$ (where "boldface" type as used herein is indicative of a vector quantity). Thus, a measure of $B_A$ is generated at each signal differencer (i.e., $B_{A1}$ at signal differencer 20-1, ..., $B_{N1}$ at signal differencer 20-N) for the field sensing elements associated with each respective transceiver location.

When viewed in isolation, the structure and function of the intra-channel aspects of any one channel of system 10 are the same as the system described in the '625 patent. For example, the structure as it relates to the intra-channel aspects of "Channel 1" (i.e., transceiver 12-1, reference sensor 14, controller/power supply 16, switching network 18 and intra-channel signal differencer 20-i) is the same as the single point system disclosed in the '625 patent. However, the present invention improves upon the '625 patent by providing for signal detection using a synchronous array of transceivers (i.e., transceivers 12-1, ..., 12-N) and by providing a unique processing scheme that generates a coherent, synchronous data set (from the measured signals) that can be used for target localization and classification without ever moving the array. That is, the present invention generates a data set that makes detection, localization and classification possible from a single measurement sequence thereby making target analysis quick and efficient. In general, the data set includes intra-channel and inter-channel quantities.

From the intra-channel perspective, the present invention generates intra-channel data sets at processors 22-1, ..., 22-N based on the measure of target signature $B_A$ (with respect to reference sensor 14) at each measurement location. For purpose of illustration, data set processor 22-1 for "Channel 1" will be described with the remaining intra-channel data set processors being analogous thereto. Although individual processors are illustrated, it is to be understood that the functions carried out by processors 22-1, ..., 22-N could be achieved with a single processor without departing from the scope of the present invention.

The total magnetic anomaly field (vector) generated by the combination of transceiver 12-1 and signal differencer 20-1 will be designated $B_{A1}$. Assuming sensing element 122 is a triaxial (i.e., X,Y,Z) sensing element, $B_{A1}$ will have three vector components $$(B_{A1X}, B_{A1Y}, B_{A1Z})$$

measured along the sensor's X,Y,Z axes so that $B_{A1}$ is given by $$B_{A1X} + B_{A1Y} + B_{A1Z}$$

In general, the $B_{A1} \ldots B_{AN}$ target signature data set, its components, and their spatial variations, contain information relating to the location and magnetic moment of a target. As shown in FIG. 1, the $B_{A1} \ldots B_{AN}$ data set is processed both in intra-channel data set processor 22 and in inter-channel data processor 24. The data can be used in several ways for target sensing. For example, as is described in U.S. Pat. Nos. 4,309,659 and 5,777,477 for static or "zero-frequency" magnetic anomalies, mathematical vector and tensor analyses of components of $B_A \ldots B_N$ can provide localization and classification of targets. However, this conventional approach is computationally complex and depends on the validity of the dipole approximation. Therefore, this approach is difficult to apply effectively to high frequency active magnetic anomaly sensing.

A simpler, more effective approach made possible by the present invention uses the intra-channel scalar total field magnitudes of $B_{A1} \ldots B_{AN}$ to provide a subset of data for target localization and classification. For example, the magnitude of $B_{A1}$ is a scalar $B_{A1}$ defined by the vector's X,Y,Z component magnitudes or $$B_{A1} = [(B_{A1X})^2 + (B_{A1Y})^2 + (B_{A1Z})^2]^{0.5}$$

Since each channel will have a similar data set, the scalar total field values $B_{A1}, \ldots, B_{AN}$ at different points in the array (defined by the locations of transceivers 12-1, ..., 12-N) can provide for magnetic anomaly location (of target 202) by what may be denoted as differential scalar proximity sensing or scalar triangulation. The differential scalar proximity sensing method for target localization using a plurality of total field values is based on the following features of the $B_A$ values:

i) The high frequency total anomaly field is a robust, rotationally invariant scalar.

ii) The transceiver channel that is in closest proximity to the target will have the largest $B_A$ value.

iii) Differential comparison of total field values from an array of transceivers can provide a modality for guiding a sensor system to a high frequency magnetic anomaly. It can readily be appreciated that, since the transceiver channel closest to target develops the largest $B_A$ signal, guidance of the sensor system toward the target simply involves adjusting the sensor system's orientation and location to equalize or balance the relative $B_A$ values from the sensor system's transceiver channels.

The differential scalar proximity sensing modality is valid for target localization at all ranges within the sensor system's detection space. However, for "far field" targets (i.e., targets located more than about three times the target's dimensions) where the well-known dipole approximation applies to the target anomaly field, the method of magnetic "Scalar Triangulation and Ranging" (STAR) can be used to determine target location and effective magnetic moment. The STAR method has been described in detail in U.S. Pat. No. 6,476,610, the contents of which are hereby incorporated by reference. Briefly, the STAR method uses scalar contractions of the static magnetic anomaly gradient tensor. A similar STAR-type method can be developed using scalar total field values for localization and classification of far field, high frequency magnetic anomalies. However, it should be noted that since the total field represents a scalar contraction of the magnetic anomaly vector, the $B_A$ values are proportional to the inverse cube of target-sensor distance rather than the inverse fourth power of distance that corresponds to the STAR method based on the gradient contraction.

From the inter-channel perspective, the present invention generates inter-channel data sets at a processor 24 based on i) the bulk vector output of each of transceivers 12-1, ..., 12-N prior to processing by differencers 20-1, ..., 20-N (i.e., $B_1, ..., B_N$), and ii) the measure of the magnetic anomaly field with respect to reference sensor 14 determined by each of differencers 20-1, ..., 20-N (i.e., $B_{A1}, ..., B_{AN}$). For clarity of illustration, processor 24 is shown as being separate from processors 22-1, ..., 22-N. However, as would be understood by one of ordinary skill in th art, processors 22-1, ..., 22-N and processor 24 could be implemented by a single processor.

Inter-channel data set processor 24 utilizes the bulk vector outputs $B_1, ..., B_N$ associated with pairs of sensing elements 122 from corresponding pairs of transceivers 12-1, ..., 12-N to generate inter-channel gradient and gradient tensor components which can be used in target detection, location and classification schemes. The present invention can utilize two (or more) transceivers (channels) with an increase in the number of transceivers (channels) providing an increase in target detection range and target localization resolution. By way of illustrative example, inter-channel processing will be described for a single pair of transceivers (e.g., 12-1 and 12-N) with all other pair combinations of a three or more transceiver array being handled in a similar fashion.

It will be assumed herein that transceivers 12-1 and 12-N lie in the same X and Z plane so that the known separation therebetween is □Y. Further, let the components of bulk vectors $B_1$ and $B_N$ (i.e., those due to magnetic anomaly field 302 and background magnetic fields) be designated ($B_{1X}$, $B_{1Y}$, $B_{1Z}$) and ($B_{NX}$, $B_{NY}$, $B_{NZ}$), respectively. The bulk differential vector field components and gradient tensor components determined by processor 24 are given respectively by $$[(B_{NX}-B_{1X}), (B_{NY}-B_{1Y}), (B_{NZ}-B_{1Z})]$$

and $$[(B_{NX}-B_{1X})/\Box Y, (B_{NY}-B_{1Y})/\Box Y, (B_{NZ}-B_{1Z})/\Box Y].$$

Since the process of differencing the respective bulk vector field components effectively removes common-mode background field components, the inter-channel differential field components and gradient tensor components are determined by processor 24 and are given respectively by $$[(B_{ANX}-B_{A1X}), (B_{ANY}-B_{A1Y}), (B_{ANZ}-B_{A1Z})]$$

and $$[(B_{ANX}-B_{A1X})/\Box Y, (B_{ANY}-B_{A1Y})/\Box Y, (B_{ANZ}-B_{A1Z})/\Box Y].$$

The above-described differential field components and gradient tensor components are used in target localization and classification schemes based on vector and tensor mathematical analyses of the component data sets. A unique advantage of this invention is that it allows the development and application of magnetic field analysis techniques (previously limited to DC or static magnetic anomalies) to high frequency active magnetic anomaly sensing. For example, as mentioned above, U.S. Pat. No. 6,476,610 describes a "Scalar Triangulation and Ranging" (STAR) method for localization and classification of static magnetic anomalies that is based on scalar contraction of gradient tensor components. The intra-channel and inter-channel data sets generated by the present invention's active sensor array and anomaly signal processing can be used in the STAR method for localization and classification of high-frequency, actively induced magnetic anomalies. Similarly, other localization and classification approaches that can use the scalar, vector and tensor data sets developed by this invention's inter-channel and intra-channel signal detection and processing elements are described for static anomalies in the afore-mentioned U.S. Pat. Nos. 4,309,659 and 5,777,477.

The advantages of the present invention are numerous. An array of transceiver elements synchronously transmit target-stimulating induction fields from multiple, spatially-separated transmit coils, and synchronously detect and discriminate target magnetic signature information from all field sensing elements in the array. Means and methods are provided to ensure effective target signal detection from all field sensing elements in the array simultaneously when the current supply to each of the transmitter coils is cutoff. Furthermore, the invention provides unique receiver-discriminator arrangements that synchronously remove background field offsets from the target signals, and develop scalar, vector and tensor differential field quantities that are indicative of the location and classification of the targets.

Although the invention has been described relative to a specific embodiment thereof, there are numerous variations and modifications that will be readily apparent to those skilled in the art in light of the above teachings. For example, when using a three or more transceiver array, inter-channel processing can include the development of gradient contraction (C) values for each pair of transceivers as disclosed in U.S. Pat. No. 6,476,610. It is therefore to be understood that, within the scope of the appended claims, the invention may be practiced other than as specifically described.

What is claimed is:

1. An active magnetic anomaly sensing and processing system, comprising:

a plurality of transceivers positioned at known relative positions, each of said plurality of transceivers including i) a transmitter for transmitting a magnetic field towards a target area wherein said magnetic field induces magnetic moments in a target in said target area which cause a magnetic anomaly field to propagate from the target, and ii) a sensor positioned a distance from the target for sensing magnetic field strength and producing a first output indicative thereof;

a reference sensor positioned further from said target area than each said sensor from said plurality of transceivers, said reference sensor being capable of sensing magnetic field strength and producing a second output indicative thereof;

means for activating and subsequently deactivating each said transmitter simultaneously to define a transmission time and a non-transmission time, respectively; and means for processing each said first output and said second output produced during each said non-transmission time to generate quantities indicative of presence, location and classification of the target in said target area.

2. An active magnetic anomaly sensing and processing system as in claim 1 wherein said reference sensor and each said sensor is a multi-axis sensor having corresponding axes aligned with one another.

3. An active magnetic anomaly sensing and processing system as in claim 1 wherein said reference sensor and each of said sensors is a magnetoresistive field sensing element.

4. An active magnetic anomaly sensing and processing system as in claim 1 wherein said means for processing includes:

means for generating a first plurality of difference values, each of said first plurality of difference values defined as a difference between the magnitude of said second output and the magnitude of said first output associated with one of said plurality of transceivers;

means for generating a second plurality of difference values, each of said second plurality of difference values defined as a difference between the magnitudes of said first output associated with a pair of said plurality of transceivers; and means for generating a third plurality of difference values, each of said third plurality of difference values defined as a difference between a pair of said first plurality of difference values.

5. An active magnetic anomaly sensing and processing system, comprising:

a plurality of transceivers positioned at known relative positions, each of said plurality of transceivers including i) a transmitter for transmitting a magnetic field towards a target area wherein said magnetic field induces magnetic moments in a target in said target area which cause a magnetic anomaly field to propagate from the target, and ii) a sensor positioned a distance from the target for sensing magnetic field strength and producing a first output indicative thereof;

a reference sensor positioned further from said target area than each said sensor from said plurality of transceivers, said reference sensor being capable of sensing magnetic field strength and producing a second output indicative thereof;

means for activating and subsequently deactivating each said transmitter simultaneously to define a transmission time and a non-transmission time, respectively; and means for processing scalar magnitudes of each said first output and said second output produced during each said non-transmission time to generate vector, tensor and scalar quantities indicative of presence, location and classification of the target in said target area.

6. An active magnetic anomaly sensing and processing system as in claim 5 wherein said reference sensor and each said sensor is a multi-axis sensor having corresponding axes aligned with one another.

7. An active magnetic anomaly sensing and processing system as in claim 5 wherein said reference sensor and each of said sensors is a magnetoresistive field sensing element.

8. An active magnetic anomaly sensing and processing system as in claim 5 wherein said means for processing includes:

means for generating a first plurality of difference values, each of said first plurality of difference values defined as a difference between the magnitude of said second output and the magnitude of said first output associated with one of said plurality of transceivers;

means for generating a second plurality of difference values, each of said second plurality of difference values defined as a difference between the magnitudes of said first output associated with a pair of said plurality of transceivers; and means for generating a third plurality of difference values, each of said third plurality of difference values defined as a difference between a pair of said first plurality of difference values.

9. A method of active magnetic anomaly sensing and processing, comprising the steps of:

providing a plurality of transceivers positioned at known relative positions, each of said plurality of transceivers including i) a transmitter capable of transmitting a magnetic field towards a target area wherein said magnetic field induces magnetic moments in a target in said target area which cause a magnetic anomaly field to propagate from the target, and ii) a sensor positioned a distance from the target capable of sensing magnetic field strength and producing a first output indicative thereof;

providing a reference sensor positioned further from said target area than each said sensor from said plurality of transceivers, said reference sensor being capable of sensing magnetic field strength and producing a second output indicative thereof;

activating each said transmitter to define a transmission time wherein said magnetic field is transmitted from each said transmitter;

deactivating each said transmitter simultaneously and subsequent to said step of activating to define a non-transmission time wherein each said sensor produces said first output associated therewith and said reference sensor produces said second output; and processing scalar magnitudes of each said first output and said second output produced during said non-transmission time to generate vector, tensor and scalar quantities indicative of presence, location and classification of the target in said target area.

10. A method according to claim 9 wherein said step of processing comprises the steps of:

generating a first plurality of difference values, each of said first plurality of difference values defined as a difference between the magnitude of said second output and the magnitude of said first output associated with one of said plurality of transceivers;

generating a second plurality of difference values, each of said second plurality of difference values defined as a difference between the magnitudes of said first output associated with a pair of said plurality of transceivers; and generating a third plurality of difference values, each of said third plurality of difference values defined as a difference between a pair of said first plurality of difference values.

* * * * *